United States Patent

[11] 3,538,980

[72] Inventor Francis Gallucci
  North Huntington Township, County of Westmoreland, Pennsylvania
[21] Appl. No. 708,660
[22] Filed Feb. 27, 1968
[45] Patented Nov. 10, 1970
[73] Assignee United States Steel Corporation
  a corporation of Delaware

[54] ROLLER CAGE FOR CONFINING CONTINUOUS CASTING AS IT EMERGES FROM MOLD
  3 Claims, 13 Drawing Figs.
[52] U.S. Cl. .................................................. 164/282,
  164/274
[51] Int. Cl. .................................................. B22d 11/12
[50] Field of Search ......................................... 164/82, 89,
  282, 283, 274

[56] References Cited
  UNITED STATES PATENTS
| | | | |
|---|---|---|---|
| 2,284,503 | 5/1942 | Williams | 164/282 |
| 2,770,021 | 11/1956 | Harter et al. | 164/89 |
| 3,166,803 | 1/1965 | Ruckstuhl | 164/283 |
| 3,318,368 | 5/1967 | Lemper | 164/282 |

FOREIGN PATENTS
| | | | |
|---|---|---|---|
| 231,631 | 2/1964 | Austria | 164/274(SB)UX |
| 741,974 | 10/1943 | Germany | 164/82 |

*Primary Examiner*—J. Spencer Overholser
*Assistant Examiner*—Michael O. Sutton
*Attorney*—Walter P. Wood ABSTRACT: A cage for confining a slab casting descending from a tubular flow-through mold is constituted by spaced opposed banks of rollers engaging both the broad faces and the edges of the slab. The rollers are journaled in side and end frames bolted together forming an enclosure open at the top and bottom. The rollers engaging the slab edges are adjustable to various slab widths. Cooling-spray nozzles extend between adjacent rollers of all banks. Thrust rods slidable through the side and end frames have terminal rollers for centering the conventional starter bar as it is raised to starting position. Actuating cylinders for the thrust rods have their piston rods engageable therewith by a self-acting disconnectible latch. Screw jacks are provided for making slight lateral adjustment of the cage to assure precise alignment with the mold. The cage stands on a fixed support and keys and keyways on the contacting surfaces thereof effect exact relative positioning. These surfaces also have self-sealing joints in pipe lines supplying water to manifolds on which the nozzles are mounted.

INVENTOR
FRANCIS GALLUCCI

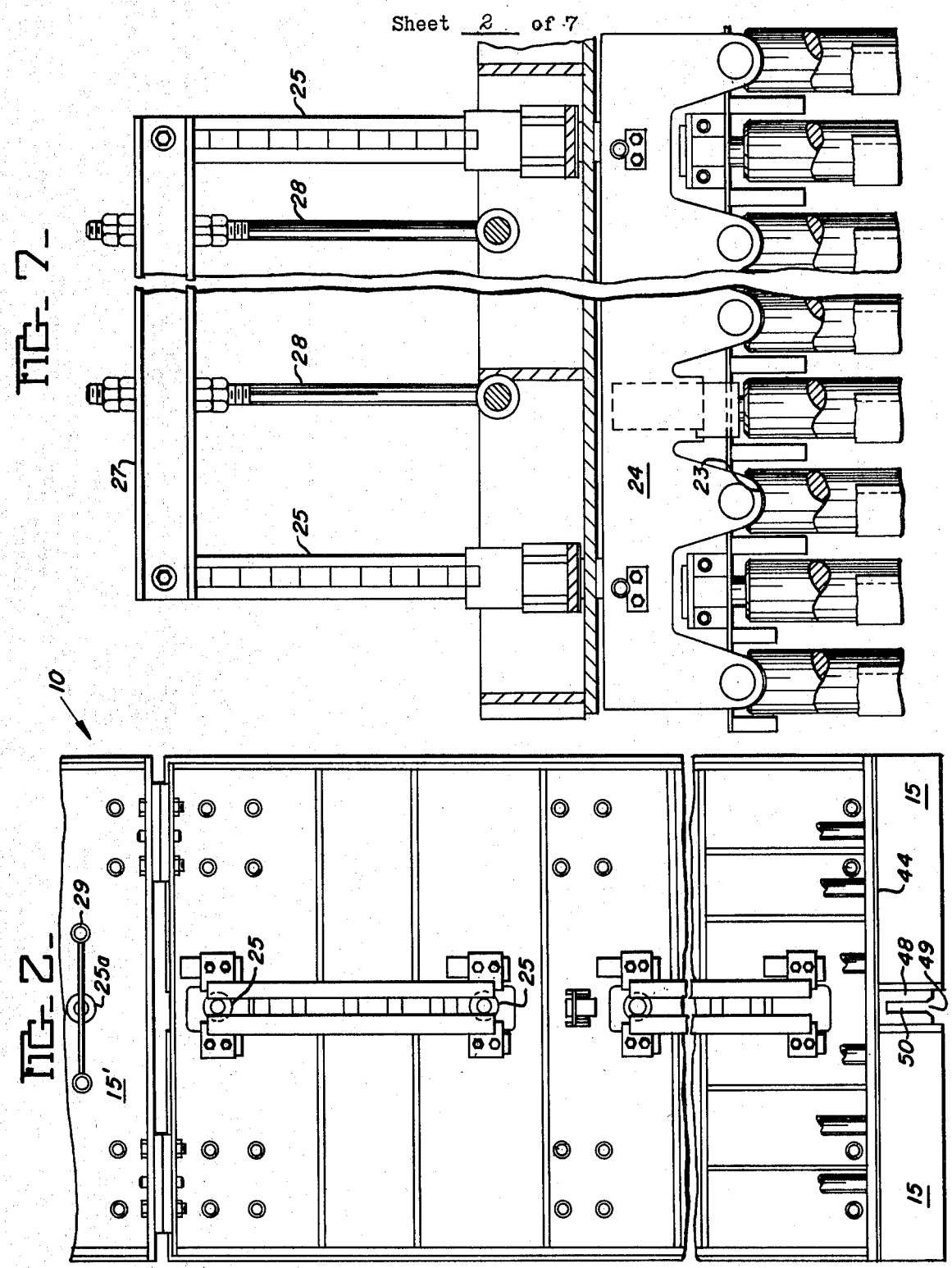

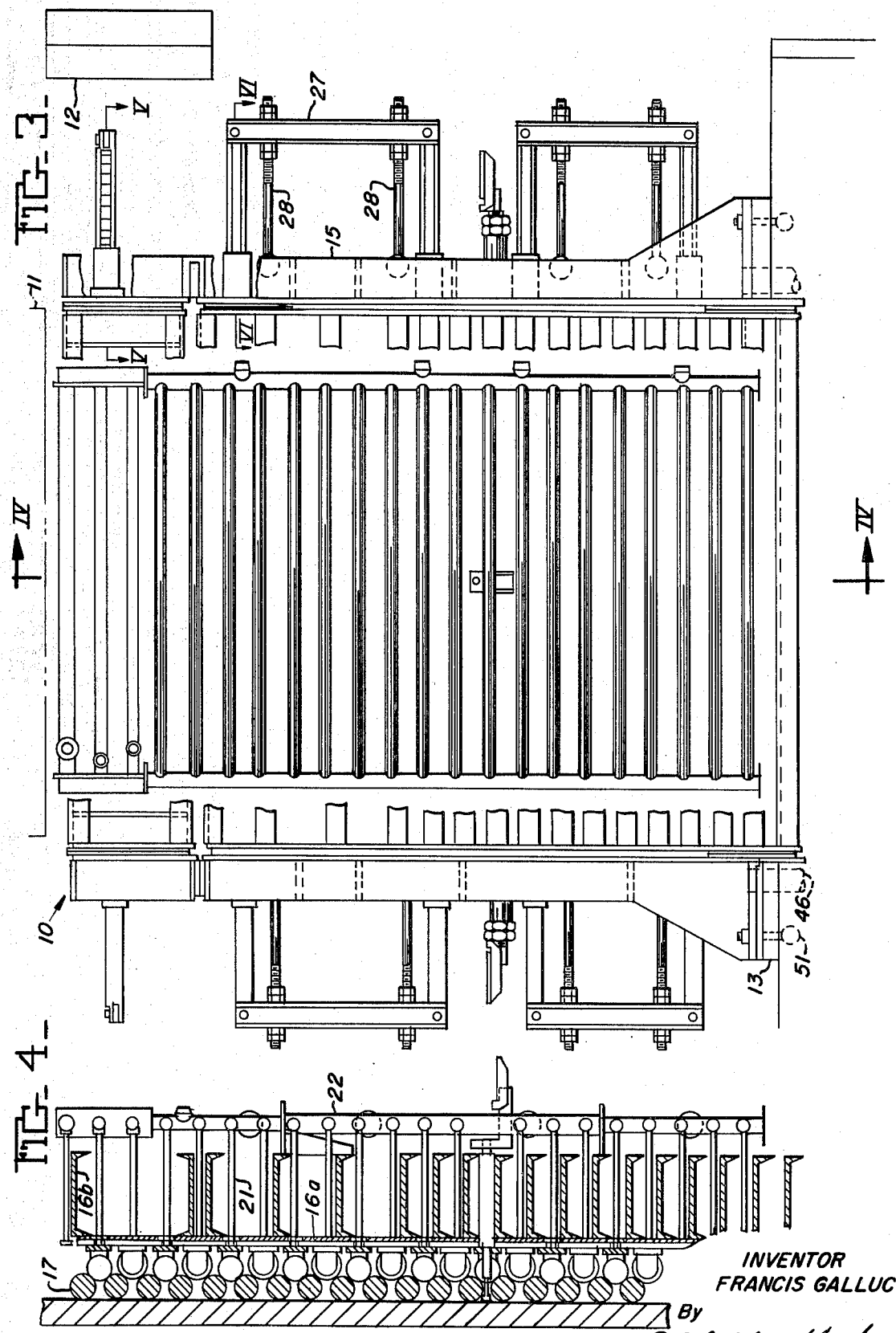

Patented Nov. 10, 1970

INVENTOR
FRANCIS GALLUCCI

By J. Wallace Hopkins
Attorney

INVENTOR
FRANCIS GALLUCCI

Patented Nov. 10, 1970

INVENTOR
FRANCIS GALLUCCI

By J. Wallace Hopkins
Attorney

Patented Nov. 10, 1970
3,538,980
Sheet 7 of 7
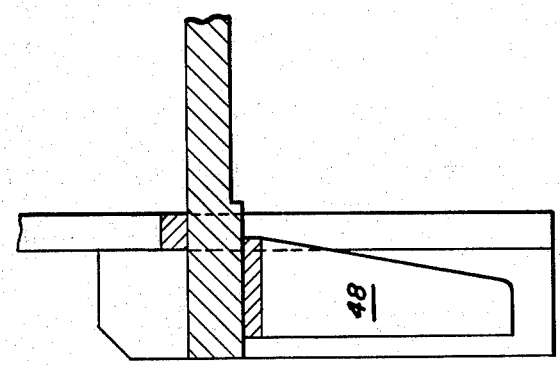
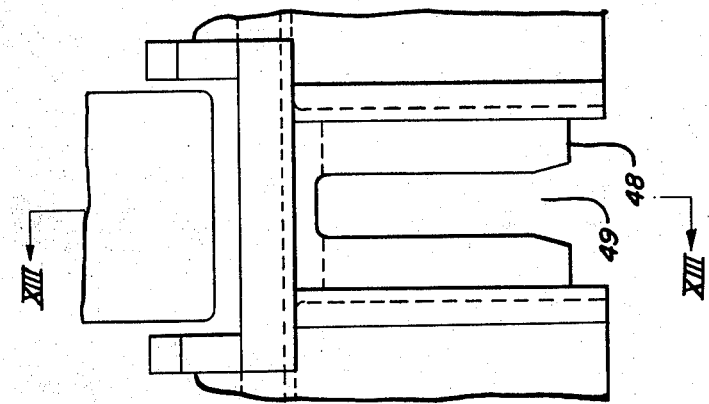
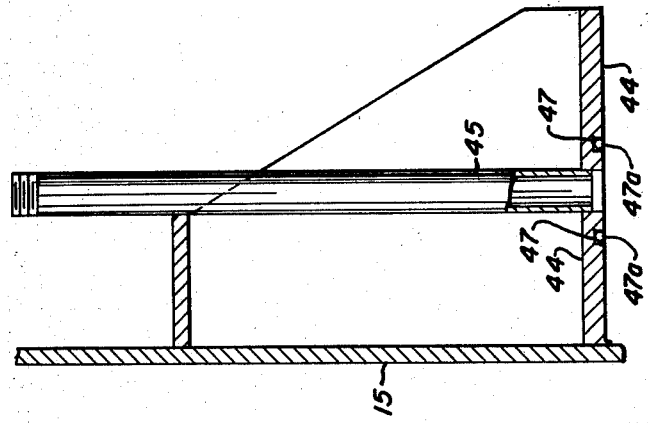
INVENTOR
FRANCIS GALLUCCI
By J. Wallace Hopkins
Attorney 3,538,980

ROLLER CAGE FOR CONFINING CONTINUOUS CASTING AS IT EMERGES FROM MOLD

CROSS REFERENCE TO RELATED APPLICATION

The cage or mold-discharge rack disclosed herein is adapted for cooperation with, and has some aspects of similarity to, the guide-roller rack of Charles H. Bode, Jr. application Ser. No. 708,684, filed Feb. 27, 1968, now U.S. Pat. No. 3,528,488.

BACKGROUND OF THE INVENTION

This invention relates to the continuous casting of metal, e.g., steel, and more particularly, to a cage of spaced banks of rollers through which the casting descends on emergence from the tubular flow-through mold usually employed. The cage or mold-discharge rack is located immediately below the mold and stands on the guide-roller rack (Bode application) which is a continuation of the cage serving to guide the casting downwardly until it enters the pinch rolls below the guide-roller rack.

SUMMARY OF THE INVENTION

In general terms, the structure of my invention comprises a rigid housing or cage including spaced side and end frames. Guide rollers adapted to engage the broad faces of a cast slab are journaled in the side frames and rollers adapted to engage the edge faces of the slab are journaled in the end frames. The rollers engaging the edge faces of the slab are adjustable to permit cooperation with slabs of different widths. Nozzles for discharging sprays of cooling liquid onto all faces of the slab are mounted on the several frames and self-sealing make-and-break connections are provided between pipes extending upwardly from the bottom of the housing of the cage or mold-discharge rack, and supply pipes installed in the guide-roller rack therebelow. The frames of the mold-discharge rack also have reciprocable rods adapted to advance into engagement with the broad and edge faces of a starter bar to center it as it is raised through the cage and introduced into the lower end of the mold. Jacks are provided to effect minor horizontal adjustment of the cage to bring it into precise alignment with the mold.

BRIEF DESCRIPTION OF THE DRAWINGS

A complete understanding of the invention may be obtained from the following detailed description and explanation which refer to the accompanying drawings illustrating the present preferred embodiment. In the drawings:

FIG. 2 is an end elevation with parts omitted;

FIG. 3 is a side elevation;

FIG. 4 is a partial vertical section taken along the plane of line IV–IV of FIG. 3;

FIG. 7 is a partial central vertical section through one of the end frames;

FIG. 11 is a partial section through the bottom of one of the end frames showing a portion of a self-sealing make-and-break joint;

FIG. 12 is a partial elevation showing a detail; and

FIG. 13 is a partial section taken along the plane of line XIII–XIII of FIG. 12.

DETAILED DESCRIPTION OF PREFERRED EMBODIMENT

Figure 1:
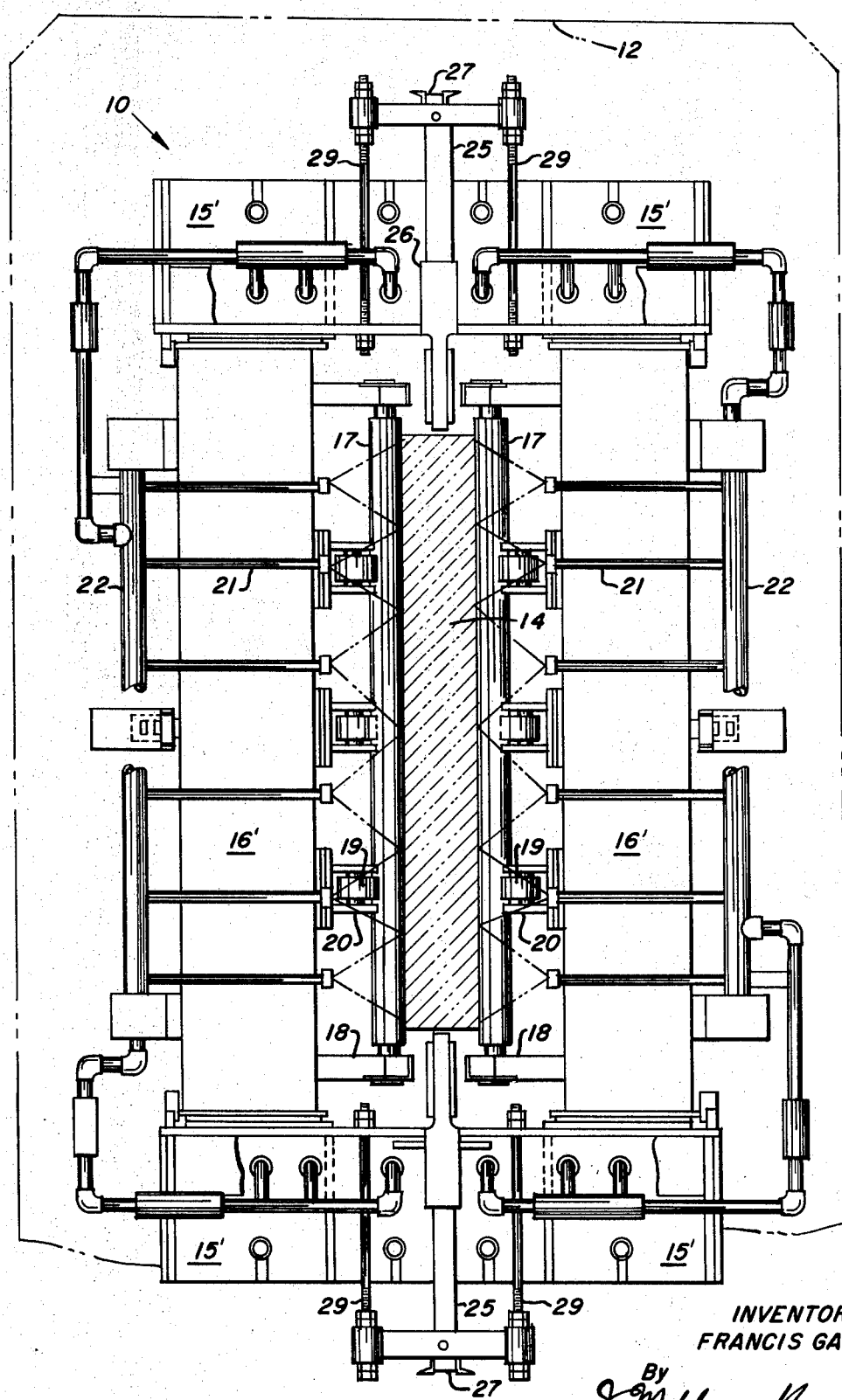
FIG. 1 is a plan view showing in section a slab casting confined by the cage.

As stated, the cage or mold-discharge rack of my invention, indicated generally at 10 in FIGS. 1 and 2, is located directly below the conventional, tubular flow-through mold, shown diagrammatically at 11. In fact, the cage extends downwardly through the oscillator frame, shown in outline at 12, on which the mold is mounted and stands on top of the guide-roller rack, shown generally at 13, which is mounted in any suitable manner on the girders of the building in which the continuous casting apparatus is housed. The principal function of the cage 10 is to confine and guide the cast rectangular section slab 14 descending therethrough and support the initially thin skin thereof against rupture under the ferrostatic head of the liquid metal thereabove, while intense water cooling is applied to cause inward solidification of the slab from its surfaces.

Cage 10 is made up of end frames 15 and side frames 16 bolted together to form a rigid rectangular housing, open at both upper and lower ends, as shown in FIG. 1. The frames have detachable upper portions 15' and 16' generally similar to the remainder thereof and bolted thereto for easy removal. Frames 15 are like an open-sided box or pan fabricated from steel plate. Frames 16 are composed of a plate 16a and stiffener channels 16b welded transversely thereof. Rollers 17 arranged in opposed banks, adapted to engage the broad faces of slab 14, are journaled in bearings 18 mounted on plates 16a. Spaced backup rollers 19 engaging adjacent pairs of rollers 17 are similarly journaled in bearings 20. Nozzles 21 discharging sprays of cooling liquid onto the slab extend from a pipe manifold 22 through holes in plates 16a and between rollers 17. Manifolds 22 are secured to frames 16 by overlapping channels 16b welded to the manifold and frame, respectively, and bolted together. Nozzles 21 are arranged to effect substantially uniform cooling of the slab, and to avoid interference with backup rollers 19.

Figure 5:
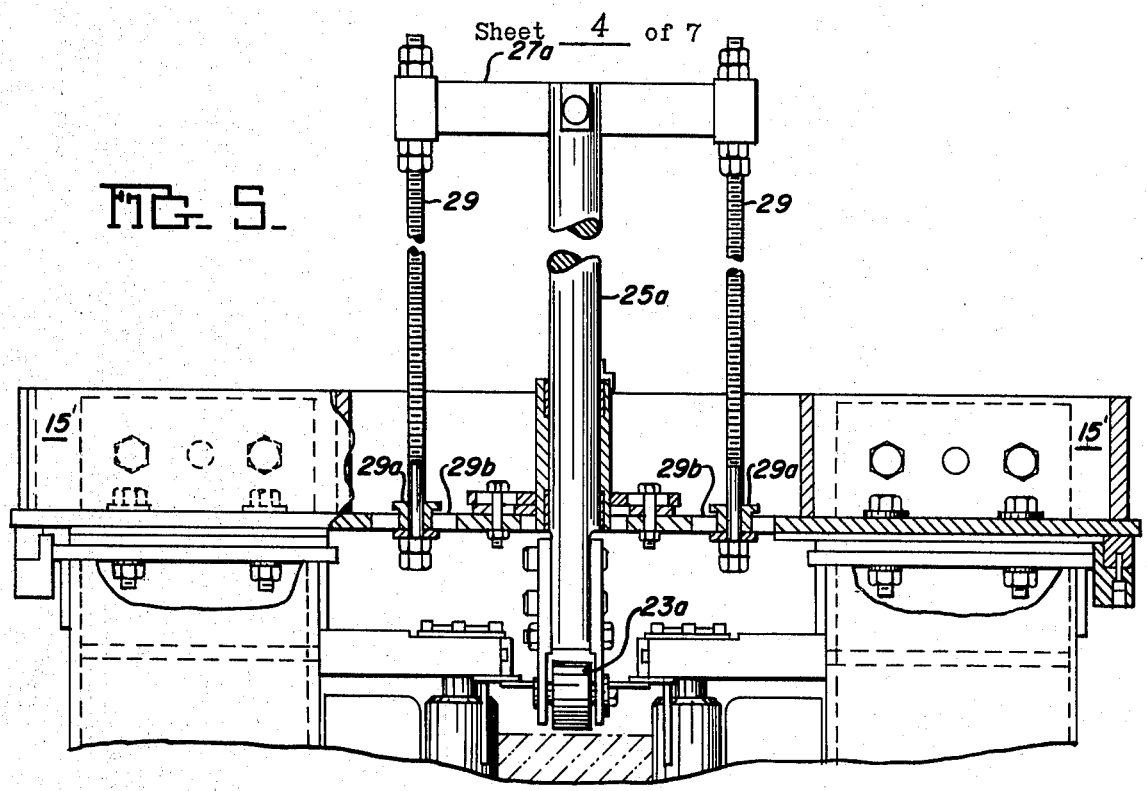
FIG. 5 is a partial horizontal section taken on the plane of line V–V of FIG. 3.
Figure 6:
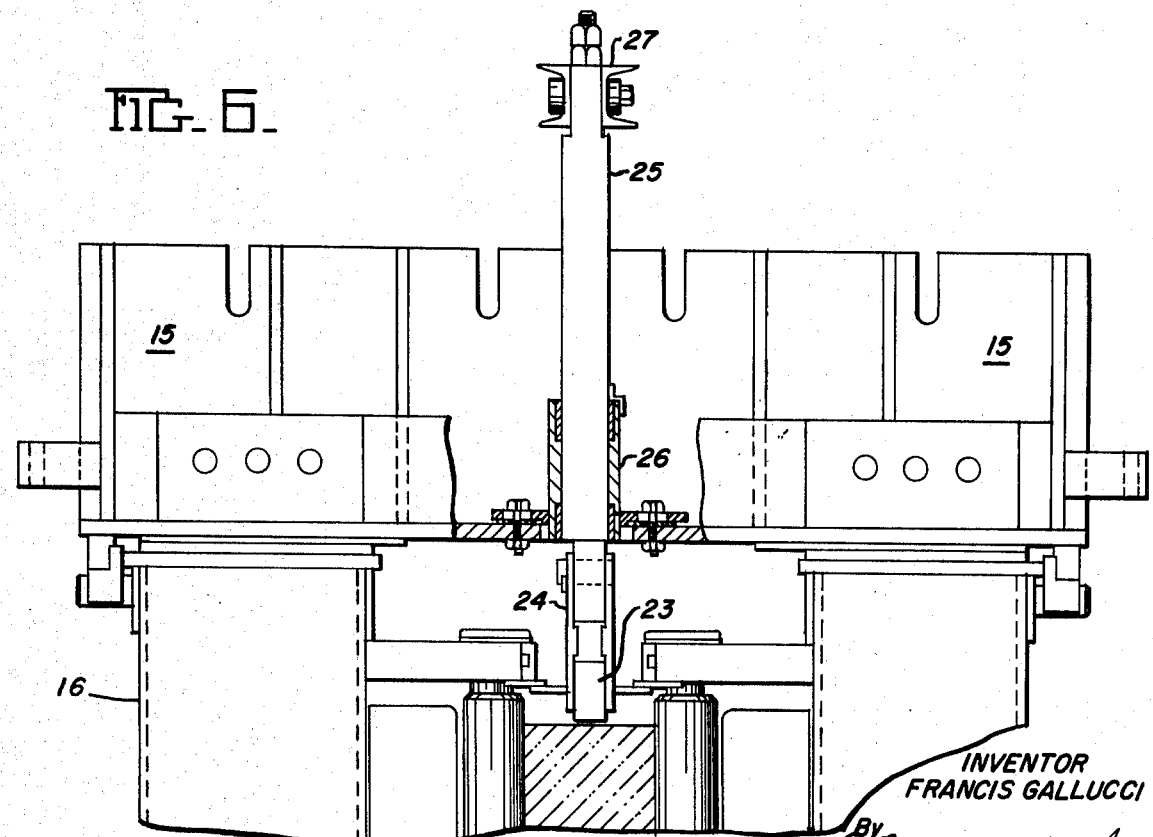
FIG. 6 is a similar section taken on the plane of line VI–VI of FIG. 3.

Frames 15 mount vertically spaced rollers 23 engaging the edges of slab 14 (FIGS. 6 and 7). Rollers 23 are journaled in spaced carrier plates 24 on the inner sides of the frames. Plates 24 are secured to two pushup rods 25 slidable in sleeves 26 (FIG. 6) secured to frames 15. The two rods connected to each set of plates 24 are connected by a pair of bridge beams 27-27. Eye bolts 28 pivoted to frames 15 extend between beams 27-27. Nuts on these bolts make it possible to advance or retract the beams and plates 24 to set rollers 23 for different slab widths. Rollers 23a in the detachable upper portions 15' of frames 15 are similarly journaled and mounted as shown in FIG. 5 but the single pushup rod 25a thereof is actuated by a bridge beam 27a through nuts on a pair of stud bolts 29 rigidly secured to the frames, as by bushings 29a movable in slots 29b in the vertical inner plate of frames 15'.

Figure 8:
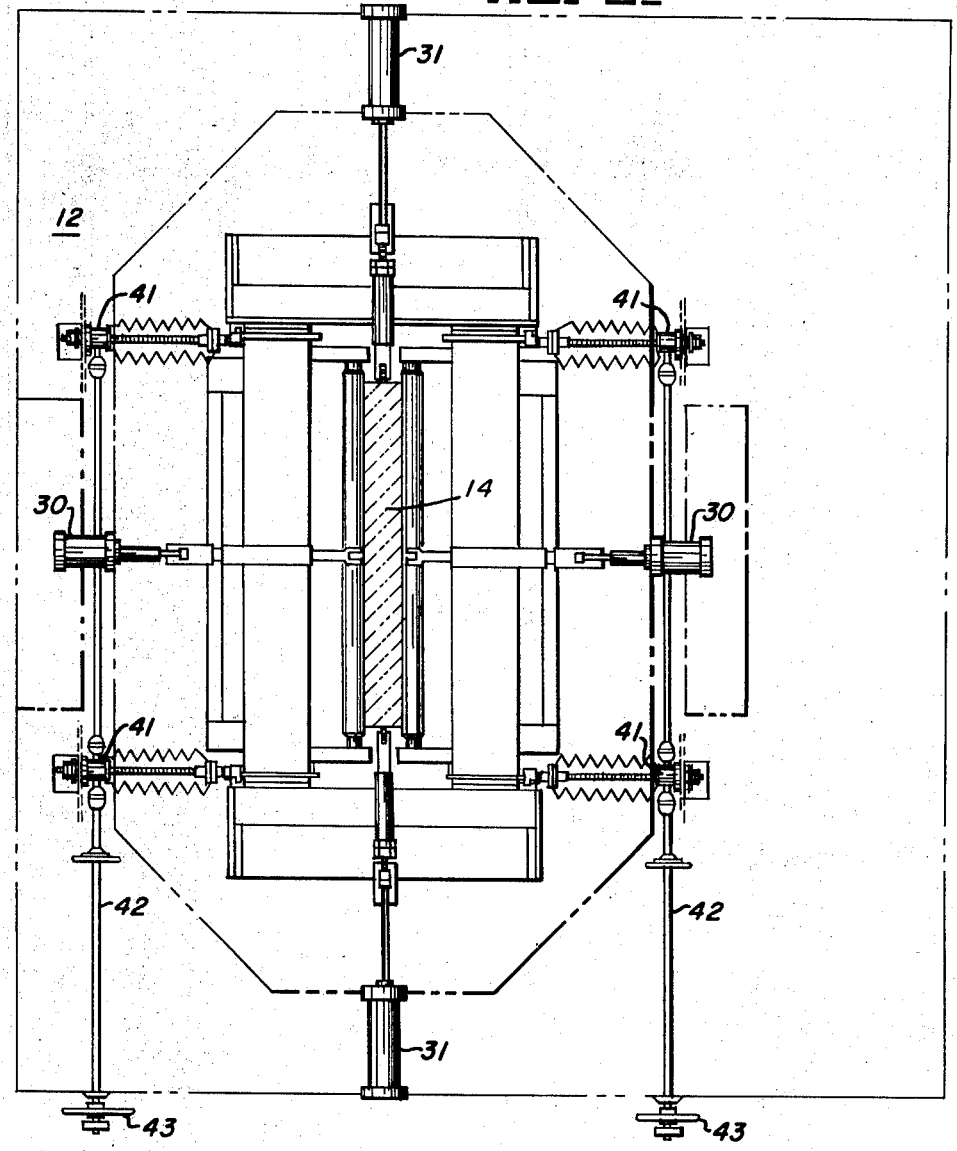
FIG. 8 is a plan view of the mold-oscillator frame through which the cage or mold-discharge rack extends, showing the reciprocable rods for centering the starter bar and the cage-adjusting jacks.
Figure 9:
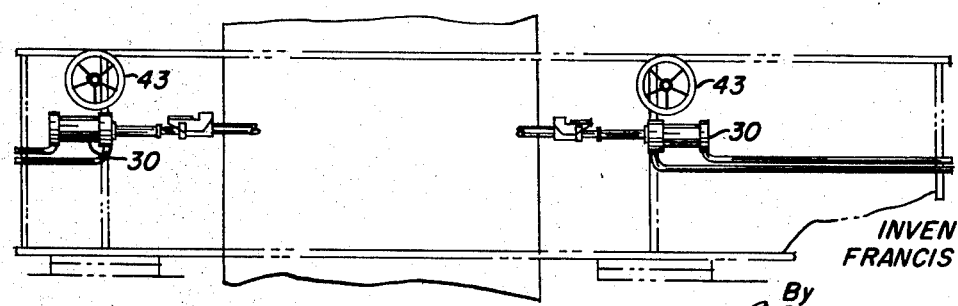
FIG. 9 is an elevation of the mold-oscillator frame.
Figure 10:
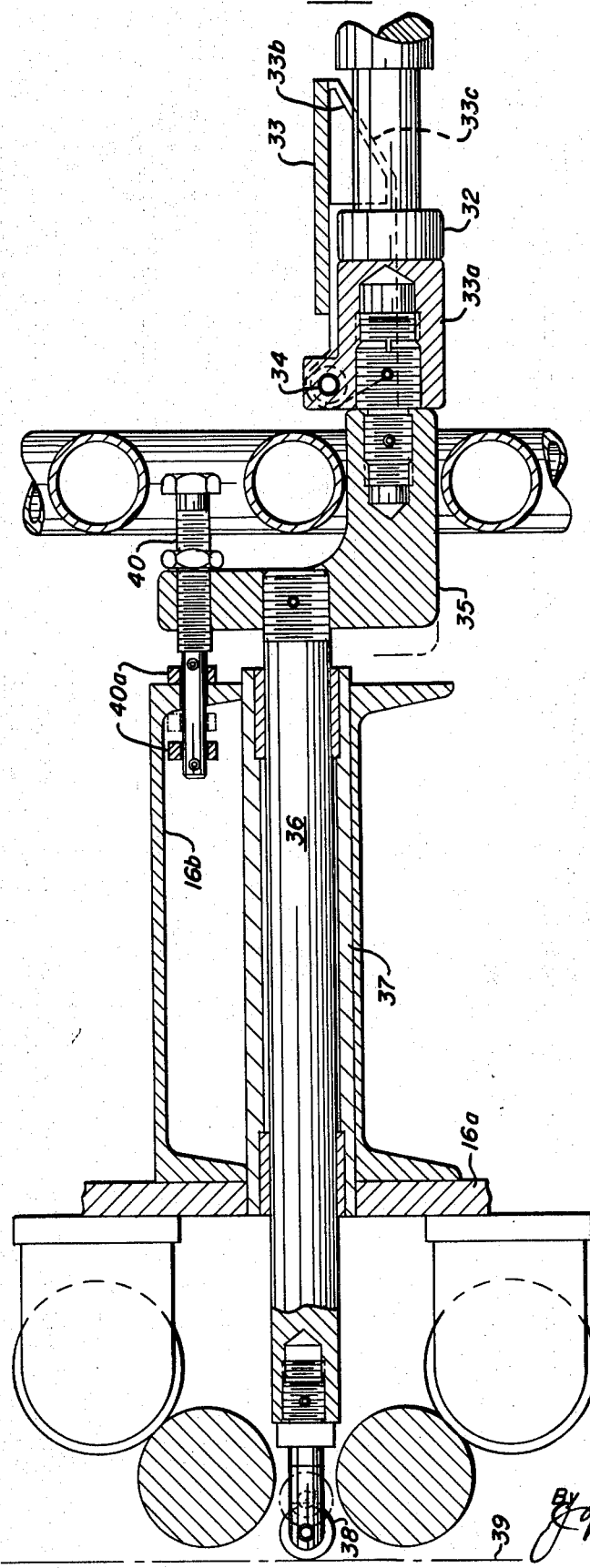
FIG. 10 is a vertical section through one of the centering rods.

Referring now to FIGS. 8 and 9, the mold-oscillator frame 12 mounts pairs of opposed fluid-pressure cylinders 30 and 31 centered on the broad and narrow faces of the slab 14. The piston rod of each cylinder has an enlarged head 32 thereon adapted to engage a tiltable latch 33 (FIG. 10). The latch is pivoted at 34 to a bracket 35 which has a body portion 33a adapted to be engaged by head 32. The latch has spaced depending ears 33b adapted to engage behind head 32. Inclined edges 33c on the latch are engaged by head 32 as it advances and this tilts the latch upwardly until the ears clear the head and the latch falls down to the illustrated position.

Bracket 35 is mounted on an actuator rod 36 slidable in a sleeve 37 normal to plate 16a. At the extreme end of the rod, a roller 38 is journaled for centering the starter bar the outline of which is shown at 39. Bracket 35 has an adjustable limit-stop screw 40 threaded through a tapped hole therein and the screw has a reduced shank extending through a hole in the outer flange of one of the channels 16b. Collars 40a on the screw shank limit reciprocating movement of the rod 36. Cylinders 31 operate actuator rods like that shown at 36, slidable in sleeves extending through the vertical plate of frames 15, normal thereto.

FIGS. 8 and 9 also show screw jacks 41 engaging frames 15 for minor transverse adjustment of cage 10. The jacks are mounted on mold-oscillator frame 12 and are operated in pairs by cross shafts 42 parallel to rollers 17. Hand wheels 43 on these shafts permit the jack screws to be advanced or retracted as needed to effect minor adjustment of cage 10 for precise alignment with mold 11.

Referring now to FIG. 11, it will be noted that frames 15 have bottom flanges 44. Holes in these flanges have cooling water tubes 45 set therein which extend upwardly and make connection with manifolds 22. The guide-roller rack 13 has water supply pipes 46 terminating flush with the top thereof which register with the holes in which tubes 45 are set when the cage 10 is set on rack 13. Grooves 47 in flanges 44 around the holes in which tubes 45 are set, with seal rings 47a therein, effect a self sealing of the joint between pipes 46 and tubes 45 yet leave it free for immediate breaking when necessary.

FIGS. 2, 12 and 13 show key-and-slot means for ensuring proper relation between cage 10 and rack 13. A yoke 48 depending from the bottom flange 44 of each frame 15 provides a keyway 49. These keyways embrace keys 50 affixed centrally and vertically to the top of rack 13 on opposite sides thereof. Thus, when cage 10 is lowered onto rack 13, cooperative engagement of the slots and keys accurately positions the cage on the rack. After the cage has been set down in proper position on rack 13, it is secured thereto by engaging swing bolts 51 (FIG. 3).

Among the numerous advantages of my invention is the fact that the entire cage 10 may be assembled away from the continuous casting line and then lowered into place therein when desired. Removal may be effected by a straight uplift and, concomitant therewith, latches 33 are simply raised off of piston-rod heads 32. The short sections 15' and 16' of the end frames may be omitted to make possible the use of a mold of greater depth. The spray nozzles extending between the rollers engaging the broad slab faces are arranged to clear the spaced backup rollers 19 and to effect cooling at the maximum rate. Accurate positioning of cage 10 on its supports is effected by keys 50 and keyways 49. Any slight "nudging" of the cage for proper final exact alignment may be effected manually by jacks 41. Cylinders 30 and 31 accurately position the starter bar, through rods 36, as it is being raised.

Although I have disclosed herein the preferred embodiment of my invention, I intend to cover as well any change or modification therein which may be made without departing from the spirit and scope of the invention as set forth in the claims.

I claim:

1. In combination with a continuous casting mold having a tubular cavity of rectangular section extending therethrough, a roller cage immediately below said mold, said cage comprising side and end frames secured together forming a rigid housing open at both upper and lower ends, and opposed banks of rollers journaled in said frames adapted to engage, respectively, the broad faces and the edges of a slab formed in said mold as it emerges therefrom, the improvement comprising an actuator rod mounted on each frame and slidable normally to the general plane thereof between two adjacent rollers of one of said banks, respective starter-bar positioning rollers journaled on each rod, and power means for advancing and retracting each rod.

2. Apparatus as defined in claim 1, characterized by a limit stop screw rigidly mounted relative to said actuator rod and engageable with the frame on which it is mounted.

3. Apparatus as defined in claim 1, characterized by disengageable latch means between said actuator and said power means.